(12) United States Patent
Kropp et al.

(10) Patent No.: US 8,750,725 B2
(45) Date of Patent: Jun. 10, 2014

(54) DIGITAL OPTICAL RECEIVING MODULE, AND A METHOD FOR MONITORING THE SIGNAL QUALITY OF A TRANSMITTED, MODULATED OPTICAL SIGNAL

(75) Inventors: Jorg-Reinhardt Kropp, Berlin (DE); Jens Fiedler, Potsdam (DE)

(73) Assignee: Finisar Corporation, Sunnyvale, CA (US)

( * ) Notice: Subject to any disclaimer, the term of this patent is extended or adjusted under 35 U.S.C. 154(b) by 1250 days.

(21) Appl. No.: 10/817,725

(22) Filed: Apr. 2, 2004

(65) Prior Publication Data

US 2005/0117916 A1    Jun. 2, 2005

Related U.S. Application Data

(60) Provisional application No. 60/523,378, filed on Nov. 18, 2003.

(51) Int. Cl.
*H04B 10/69* (2013.01)
(52) U.S. Cl.
USPC .......................................... 398/208
(58) Field of Classification Search
USPC .................. 398/175, 202, 206, 208, 209, 213
See application file for complete search history.

(56) References Cited

U.S. PATENT DOCUMENTS

| | | | |
|---|---|---|---|
| 5,253,096 A * | 10/1993 | Freeman et al. | 398/189 |
| 5,524,144 A | 6/1996 | Suzuki | |
| 5,774,242 A * | 6/1998 | O'Sullivan et al. | 398/29 |
| 6,188,737 B1 * | 2/2001 | Bruce et al. | 375/355 |
| 6,433,903 B1 * | 8/2002 | Barry et al. | 398/79 |
| 6,694,273 B2 * | 2/2004 | Kurooka et al. | 702/69 |
| 6,999,680 B2 * | 2/2006 | Yamakawa | 398/34 |
| 7,024,059 B2 * | 4/2006 | Kurchuk | 385/12 |
| 7,039,328 B2 * | 5/2006 | Oomori et al. | 398/202 |
| 7,079,775 B2 * | 7/2006 | Aronson et al. | 398/137 |
| 7,106,979 B1 * | 9/2006 | Taylor | 398/209 |
| 7,123,845 B2 * | 10/2006 | Matsuyama | 398/208 |
| 2001/0046074 A1 * | 11/2001 | Kakizaki et al. | 359/110 |
| 2002/0060820 A1 * | 5/2002 | Buchali | 359/109 |
| 2002/0149821 A1 | 10/2002 | Aronson et al. | |
| 2003/0043440 A1 | 3/2003 | Suzaki et al. | |
| 2003/0043900 A1 * | 3/2003 | Deas et al. | 375/234 |
| 2003/0112496 A1 | 6/2003 | van Schyndel | |
| 2004/0008996 A1 * | 1/2004 | Aronson et al. | 398/202 |
| 2004/0067060 A1 * | 4/2004 | Aronson et al. | 398/135 |

OTHER PUBLICATIONS

Voges: "Optische Kommunikationstechnik", Kaop. 23.7, Seiten 815-821, Springer Verlag Berlin, Heidelberg 2002.
Product Brief of Advico Microelectronics GmbH regarding "Eye Diagram Monitor", 3 pgs.
Haunstein et al.: "Implementation of Near Optimum Electrical Equalisation at 10 Gbit/s", Proc. of ECOC 2000, vol. 3, Munich, Germany, Sep. 2000, 2 pgs.

* cited by examiner

*Primary Examiner* — Shi K Li
(74) *Attorney, Agent, or Firm* — Maschoff Brennan

(57) ABSTRACT

A digital optical receiving module including: an optical input, a first digital electrical output, an optoelectronic transducer device which converts a modulated optical signal, which is applied to the optical input, to an analog electrical signal, a decision-making device, which is electrically connected to the transducer device and converts the analog electrical signal to a digital signal and passes this digital signal to the digital electrical output, and a quality recording device, which is connected to the transducer device and determines the quality of the analog electrical signal before it is converted to a digital signal, with an information signal being produced as a function of the quality of the analog electrical signal. A method is also provided for monitoring the signal quality of a transmitted, modulated optical signal.

17 Claims, 3 Drawing Sheets

DIGITAL OPTICAL RECEIVING MODULE, AND A METHOD FOR MONITORING THE SIGNAL QUALITY OF A TRANSMITTED, MODULATED OPTICAL SIGNAL

RELATED APPLICATION

The present application claims priority of U.S. Provisional Patent Application Ser. No. 60/523,378 filed by Jorg-Reinhardt Kropp and Jens Fiedler on Nov. 18, 2003.

FIELD OF THE INVENTION

The invention relates to a digital optical receiving module and to a method for monitoring the signal quality of a transmitted, modulated optical signal. It is used in particular for recording and for regeneration of optical signals in digital optical receivers.

BACKGROUND OF THE INVENTION

Large amounts of data are transmitted in ever more complex networks using optical information technology. In order to ensure the functional reliability of the networks, it is necessary to monitor the transmission reliability on a transmission path, and/or the quality of the transmitted optical signals.

Digital transmission of data is described by means of hierarchically subdivided layers in accordance with OSI reference model (Reference Module for Open System Interconnection). The lowermost, bit transmission layer (physical layer) defines the physical characteristics for information transmission. The data link layer, which is located above this, comprises protocols for checking and, if necessary, for correction of the transmitted information. This is done by using specific coding methods for error detection and error correction such as 4B/5B or 8B/10B codes, or else by using more complex methods such as FEC (forward error correction). Methods such as these also allow the bit error rate and hence the transmission reliability on a transmission path to be detected.

One disadvantage of the known methods for error identification and error correction is that critical transmission paths are identified only by the occurrence of errors. However, it is impossible to assess the quality of the link even before the errors have occurred during operation of a network. Furthermore, the known methods have an increasing proportion of redundant information as the efficiency increases, so that the effective useful data rate is reduced. Accordingly, there is a need for methods which identify the occurrence of transmission errors and/or a lack of quality in the transmitted, received signals at as early a time as possible.

There are known digital optical receivers for reception and for regeneration of optical signals after passing through a transmission path which comprise an analog input part, in which the optical signal is converted to an analog electrical signal, and a digital signal processing part, in which the analog signal is regenerated to a digital data signal with a normalized amplitude and clock information. In the analog part, the received optical signal is converted by means of a photodiode to a photocurrent, and is amplified in a preamplifier. Filtering may also be provided. The analog part of the digital optical receiver is preferably linear or is in the form of an amplitude-limiting amplifier.

The digital part of the digital optical receiver has a decision maker which is, for example, a clocked D-flip-flop, which is switched using a regenerated clock (from a clock that is recovered from the data signal). The exact timing of the original signal is thus reproduced. At its output, the decision maker produces a purely digital signal, which has a digital signal form with a standardized signal level corresponding to standards that have to be complied with. The digital signal form is in this case distinguished by minimum requirements for the rising flanks and the overshoot response of the individual pulses. A digital signal is produced at the output of the decision maker, and this digital signal can no longer be distinguished from the originally transmitted signal, except for any bit errors. A corresponding digital optical receiver is described, for example, in: E. Voges, K. Petermann (Ed.): optische Kommunikationstechnik [Optical communication technology], Section 23.7, pages 815-821, Springer-Verlag Berlin, Heidelberg 2002, whose contents are to this extent incorporated by reference in the present application.

U.S. 2002/0149821 A1 discloses a circuit which is integrated in a chip in order to control an optoelectronic transceiver, which monitors and controls a large number of functions of the transceiver. The control and monitoring functions of the transceiver are in this case mapped into specific memory areas of a memory. Flags are set when predefined limit values are overshot or undershot, and the content of these flags can be recorded via a serial interface.

SUMMARY OF THE INVENTION

The present invention provides a digital optical receiving module as well as method for monitoring the signal quality of a transmitted, modulated optical signal, which determine the lack of transmission quality at an early stage after data transmission, and do not require redundant information to be provided in the datastream for this purpose.

According to the invention, a digital optical receiving module includes:
  an optical input,
  a first, digital electrical output,
  an optoelectronic transducer device which converts a modulated optical signal, which is applied to the optical input, to an analog electrical signal,
  a decision-making device, which is electrically connected to the transducer device and converts the analog electrical signal to a digital signal and passes this digital signal to the digital electrical output, and
  a quality recording device, which is connected to the transducer device and determines the quality of the analog electrical signal before it is converted to a digital signal, with an information signal being produced as a function of the quality of the analog electrical signal.

The present invention also provides a method for monitoring the signal quality of a transmitted, modulated optical signal, which has the following steps:
  conversion of a modulated optical signal which has passed through a transmission path to an analog electrical signal,
  regeneration of the signal in order to reproduce a digital signal form,
  recording of the quality of the electrical signal before its regeneration to a digital signal form, and
  production of an information signal as a function of the quality of the electrical signal.

The solution according to the invention is distinguished in that a quality assessment is carried out on the received signal, which has been converted to analog form, before this signal is processed in a decision-making device and is converted to a digital signal. The analysis of the analog signal in this case allows a quality assessment to be carried out on the transmission at a time at which any transmission errors have not yet occurred, since the signal has not yet been passed through the decision-making device or output as a digital signal at the time of the quality assessment. Any deterioration in the transmission path can thus be detected at a very early stage, thus allowing considerably better reliability to be achieved for the entire communication network.

Known digital optical receivers normally have a standardized digital interface. Provision is accordingly preferably made for a quality assessment to be carried out within the digital optical receiving module.

The solution according to the invention allows errors to be identified even at a stage before the data is emitted to the standardized digital interface. The information content of the analog signal that is produced by the optoelectronic transducer device can be evaluated for this purpose. In particular, it is possible to use the waveform of the analog signal to deduce the quality of the transmission and of the transmitted signals. This information is lost downstream from the decision maker. If it is found that the quality of the received signals is below a specific value, this is signaled, for example, to a management system for an associated network, in response to which this management system can initiate measures to overcome errors, or can make use of alternative transmission paths at an early stage. Until now, this has been possible only after the identification of bit errors in the regenerated bit stream.

The quality of the analog electrical signal is established by determining at least one parameter which depends on the quality of the signal. In this case, a signal is of high quality when it reproduces the bit sequence which it modulates with as little distortion as possible, that is to say when it has as few discrepancies as possible from the digital signal which existed before passing through the transmission path.

One preferred refinement of the invention provides for the module to have not only a first, digital electrical output for the regenerated digital signal but also a second electrical output, via which the information signal which is produced by the quality recording device, or a signal derived from it, is produced for external communication. The result of the quality assessment can thus be signaled via this second electrical output to a control unit and/or to network management. The second electrical output in this case provides an additional path in parallel with the first, digital output.

The second electrical output is in one preferred refinement provided by a serial bus, via which the data can be read. Alternatively, the result of the quality monitoring is emitted by means of a defined signal level (for example high, low) at the second electrical output. For this situation, the second electrical output is also referred to in the following text as the function output.

Provision is preferably made for the module to have a memory which contains at least one predetermined reference value for the quality of the analog electrical signal. This reference value is stored in a memory area (which is provided for this purpose) of the memory, for example in the course of module production. The reference value in this case represents a specific transmission quality. The quality recording device now compares the quality of an electrical signal with the reference value, and produces an information signal as a function of the result of the comparison. As already mentioned, this information signal may be a specific signal level, which is produced at the second electrical output. In an alternative refinement, the information signal is a flag which is set in a specific memory area of a memory and can be read from the memory via a communication link such as a serial bus. It is likewise possible to provide for the information signal to be a specific numerical value, which is stored in a specific memory area of a memory. This value can once again be read from the memory via a communication link such as a serial bus.

In one preferred refinement, the quality of the recorded analog signal is determined by evaluation of an eye diagram or parts of it. An eye diagram shows the time on the x axis and the input signal on the y axis, with the regenerated clock being used for triggering. The pattern of numerous curves, which are shown for each clock cycle, that appears is in the typical form of an eye (eye diagram), with the width of the eye in the horizontal direction making it possible to determine the tolerance on the decision-maker time, and the opening in the vertical direction making it possible to determine the tolerance on the decision-maker threshold. The more widely open the eye pattern is, that is to say the greater the area of the eye, the better is the signal quality and the more reliably can the data be reconstructed.

The quality of the analog electrical signal is preferably determined by assessment of the free internal area of the eye diagram. The evaluation process determines, for example, the error probability when the sampling time is varied with respect to the phase and/or the amplitude of the signal. Any variation in the phase angle of a pulse is also referred to as jitter. To this extent, with regard to this aspect, the quality of the analog electrical signal can be determined from a jitter measurement.

The size of the eye opening is determined by any variation in the amplitude. The amplitude varies in particular as a function of the noise component in the signal. Measurement of the variation of the amplitude of the eye diagram thus corresponds to a measurement of the noise component. This is used, for example, to determine the ratio of the mean deviation in the high level to an absolute value.

The parameters "jitter" and noise" which have been mentioned may also be determined in a different manner than by analysis of an eye diagram. For example, only the rising flank or falling flank of the signal may be considered, from the start. In general, it should be mentioned that there are a number of possible ways to determine the signal quality and to map it onto a numerical value. For example, in addition to jitter and noise, it is also possible to record the flank gradient as a measure of the quality.

It is also possible to simultaneously determine two or more parameters which are dependent on the quality of the signal, and either to carry out a separate comparison with a previously stored reference value for each parameter, or to combine the parameters to form a numerical value.

The quality is determined in the quality recording device, which is in the form of an electrical circuit. Appropriate electrical circuits are known per se, and are used, for example, in methods, which are known per se, for electronic dispersion compensation (EDC). Appropriate EDC chips are manufactured, for example, by advICo microelectronics GmbH, 45657 Recklinghausen, Germany, under the designation "Eye Diagram Monitor". These known EDC chips in this case provide an evaluation of the eye diagram in order to record any signal distortion. In general, EDC chips are used for signal improvement by equalization and other methods for improving the signal form. The quality of the data signal is also recorded in this case. The result of the quality analysis is, however, used solely for signal improvement but not, as in the case of the present invention, for monitoring and indicating the transmission quality.

The receiving module preferably also has a controller (control processor) which controls at least the quality recording device as well as external communication. If required, further components of the module, such as a signal conditioning device, may also be controlled by the controller. It is also possible to provide for the controller to be part of the quality recording device.

In one refinement of the invention, the digital optical receiving module also has a signal improvement device, which produces a better-quality output signal. The signal improvement device is in this case arranged between the transducer device and the decision-making device. The analog output signal from the signal improvement device is supplied firstly to the quality recording device and secondly to the decision-making device. In this refinement, the quality of the analog signal is thus assessed from an analog signal whose quality (flank gradient, noise component, signal level, jitter, etc.) has already been improved. Any lack of quality in the data transmission over the transmission path that is found on the basis of a comparison with a reference value is thus only found if the signal regeneration has not been able to sufficiently improve the characteristics of the transmission signal, either.

In one alternative embodiment, a signal improvement device such as this is arranged downstream from the quality recording device. The quality recording device thus checks the quality of the signal before its quality has been improved. The signal improvement in the signal improvement device (for example with regard to flank gradient, noise component, signal level, jitter, etc. of the signal) is in this variant used solely to supply the decision-making device with an improved signal, thus improving the probability that the decision-making device will in each case make the correct decision (high, low) for the production of a digital signal.

In these refinements, it is possible to provide for the signal improvement device together with the quality recording device to be part of a circuit for electronic dispersion compensation (EDC).

Furthermore, provision is preferably made for the result of the quality monitoring not only to be output at the second electrical output but also to be passed to the signal improvement device, so that the signal improvement device outputs an analog output signal whose quality is as high as possible, as part of a closed-loop or open-loop control process.

BRIEF DESCRIPTION OF THE DRAWINGS

The invention will be explained in more detail in the following text using two preferred exemplary embodiments and with reference to the figures, in which.

DESCRIPTION OF A NUMBER OF PREFERRED EXEMPLARY EMBODIMENTS

Figure 1:
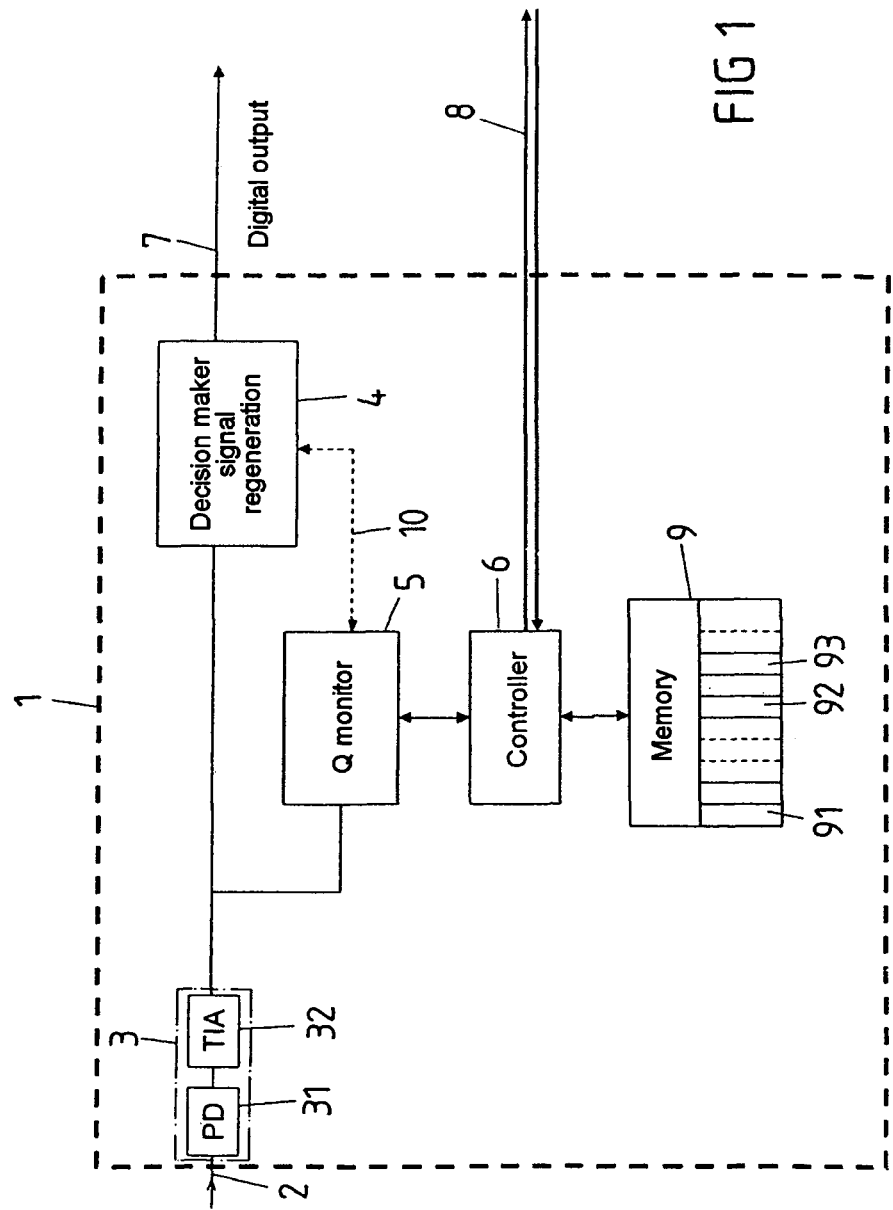
FIG. 1 shows a first exemplary embodiment of a digital optical receiving module, illustrating the individual functional blocks.

FIG. 1 shows a digital optical receiving module 1 which, at an optical input 2, has an optoelectronic transducer device which comprises a photodiode 31 and a preamplifier 32. The photodiode is, for example, a pin diode or an avalanche photodiode, which converts the arriving optical signal to a photocurrent. The amplifier 32 is an analog preamplifier, for example a transimpedance amplifier (TIA).

The signal which is applied to the optical input 2 is a modulated and coded optical signal which has passed through a data transmission path. The conversion process in the transducer device 3 results in an analog electrical signal. Signal distortion and other interference which the optical signal experiences while passing through the transmission path is reflected in the signal form of the analog electrical signal.

The output of the transducer device 3 is connected to a decision-making device 4, which converts the analog electrical signal to a digital signal. The decision-making device 4 represents a circuit component for signal regeneration as is known from the prior art. The signal regeneration process is carried out by re-amplification, re-shaping and re-timing. In this case, re-amplification means the reproduction of a standardized signal level, re-shaping means the reproduction of the digital signal form (with the need to comply with minimum requirements for the rising flanks and the overshoot response of the pulses), and re-timing means strict time adjustment of the pulses to form a data clock which is produced from the data stream in the digital receiving part. The latter is carried out, for example, by means of PLL circuits (PLL=Phase Locked Loop) which are known per se, and which will therefore not be described any further here.

Re-amplification may also be carried out in a signal improvement device upstream of the decision-making device, as will be described in more detail with reference to the exemplary embodiments in FIGS. 2 and 3. However, re-timing and re-shaping in order to produce a digital signal are carried out in the decision-making device.

The actual decision maker normally includes a flipflop, which is clocked using the recovered data clock. At the output 7 of the module 1, the decision-making device 4 produces a purely digital signal, which can no longer be distinguished from the originally transmitted signal, except for any bit errors.

The receiving module 1 furthermore has a quality recording device (Q monitor) 5, which is likewise connected to the output of the transducer device 3. The quality recording device 5 records the quality of the analog electrical signal which is produced at the output of the transducer module 3. When the quality of the received data is poor, and the bit error is correspondingly high, this analog signal is subject to corresponding deformation in the signal form. The quality recording device 5 determines the quality of the analog signal, to be precise before its conversion to a digital signal in the decision-making device 4, and produces an information signal as a function of the quality at that time, and it is also possible to provide for an information signal to be produced only if the quality is below a predetermined minimum value.

The quality recording device 5 is in this case connected to a controller 6 which is in the form of a microprocessor. The controller 6 is connected to a memory 9 which has a large number of memory areas 91, 92, 93, as will be explained later. The memory 9 can be written to and read from via the controller. The controller 6 can communicate with other electronic components via a second electrical output 8 of the receiving module 1, which is independent of the digital output 7. The second output 8 is preferably a serial bus, with the controller 6 being connected to the serial bus via a standard serial interface, which is not illustrated.

The controller 6 controls the quality recording device 5 as well as its access to the memory 9 and external communication via the serial bus 8. If a function output at which there is a specific signal level (for example high or low) is provided instead of a serial bus as the electrical output 8, the controller 6 controls such a function output 8.

The controller 6 may also be part of the quality recording device 5, or the two may represent a common unit.

The memory 9 has a memory area 91, which represents a characteristic value or reference value for a specific, required transmission quality. This value is, for example, read to the memory area in the course of production of the module. However, this value can also be read to the memory area 91 via the serial interface 8 at a later time, or can be modified in this memory area 91.

The quality recording device 5 reads the value from the memory area 91 via the controller 6 and compares this value with the quality of the transmitted signal during transmission. In order to allow two numerical values to be compared, the quality of the transmitted signal is in this case represented by a specific numerical value.

One possible way to achieve this is for the quality recording device 5 to evaluate the free, internal area of an eye diagram. An eye diagram has input signals for the low signals and for the high signals superimposed in the correct phase. The input signal is in this case shown on the y axis, and the time is shown on the x axis. The greater the opening of the eye is, the higher is the quality of the signal. The area of the eye diagram can thus be used to determine a valid parameter for the quality of the analog signal. In addition to the area of the eye diagram, it is also possible to determine values derived from it, such as the noise component in the signal, jitter or the flank gradient.

It should also be mentioned that it may be advantageous for the quality recording device 5—for example in order to superimpose the input signals in the correct phase to form an eye diagram—to have information relating to the clock of the received signal. This can be achieved by producing a reference clock in the quality recording device 5 itself. In another preferred refinement, the quality recording device 5 is supplied with the clock signal that is regenerated in the decision-making device 4. This is done via the link 10 shown in FIG. 1. The quality recording device 5 thus also preferably has a clock signal via which suitable sampling times can be determined, in order to determine the quality of the received analog signal.

The value which is actually obtained for the signal quality is compared with the reference value that is stored in the memory area 91. An information signal is produced as a function of this comparison. The comparison may in this case be carried out in the quality recording device 5 or in the controller 6, in which case, as already mentioned, the controller 6 may be part of the quality recording device.

There are now various possible ways to represent the information signal that is produced in this way and to transmit it to further components. In the situation where the comparison of the instantaneous characteristic value with the reference value results in the quality of the transmitted signal being below a critical limit value, a flag can then be sent via the controller 6, in a memory area 92 which is provided for the purpose in the memory 9 (or in some other memory). The flag can be read via the output 8, for example by a host computer, an end user or a management system for the associated network.

In another refinement, it is possible to provide for a numerical value which is dependent on the quality of the analog signal to be stored in a specific memory area 93 of the memory 9 (or of some other memory). This numerical value is, for example, the characteristic value for the quality of the analog signal at that time. In another example, the numerical value is the ratio of the characteristic value at that time to the reference value. The numerical value may once again be read from an external component via the controller 6 and the output 8.

A further example of the signal which is produced by the quality recording device 5 is for a signal level to be emitted at the output 8 as a function of the comparison of the characteristic value of the signal quality at that time with the reference value. For example, a high level is emitted when the signal quality is above the reference value, while the signal level is drawn to the low level when the quality is below the reference value.

The described refinements for signaling that the signal quality is below a predetermined value should be regarded as being only by way of example. Further variants of such signaling and suitable signal production are possible. In principle, it is also possible in this case to provide for the corresponding information to be superimposed as an in-band signal on the signal at the digital output, rather than being produced via a separate, additional output 8.

It should be mentioned that the quality recording device 5 may also pass a control signal to the decision-making device 4, as indicated by the dashed arrow 10. This allows additional information relating to the signal quality and which the quality recording device 5 has determined to be taken into account during the signal regeneration process in the decision-making device 4.

The optical receiving module 1 operates in such a way that a modulated optical signal which is applied to the data input 2 and has passed through a transmission path is converted by means of the photodiode 31 to an analog electrical signal, and this is then amplified in the preamplifier 32. This analog signal is supplied firstly to the decision-making device 4, which regenerates the signal in order to reproduce a digital signal form. The signal is also supplied to the quality recording device 5, which carries out a quality assessment taking account of a previously stored reference value. The result is emitted via an electrical output 8, with the controller 6 monitoring the entire process and monitoring the access to the memory 9. If the received signal, which has been converted to an analog signal, falls below a predetermined quality level and/or there is a deterioration in the transmission path corresponding to this, this is also identified and is communicated before signal regeneration in the decision-making device 4.

Figure 2:
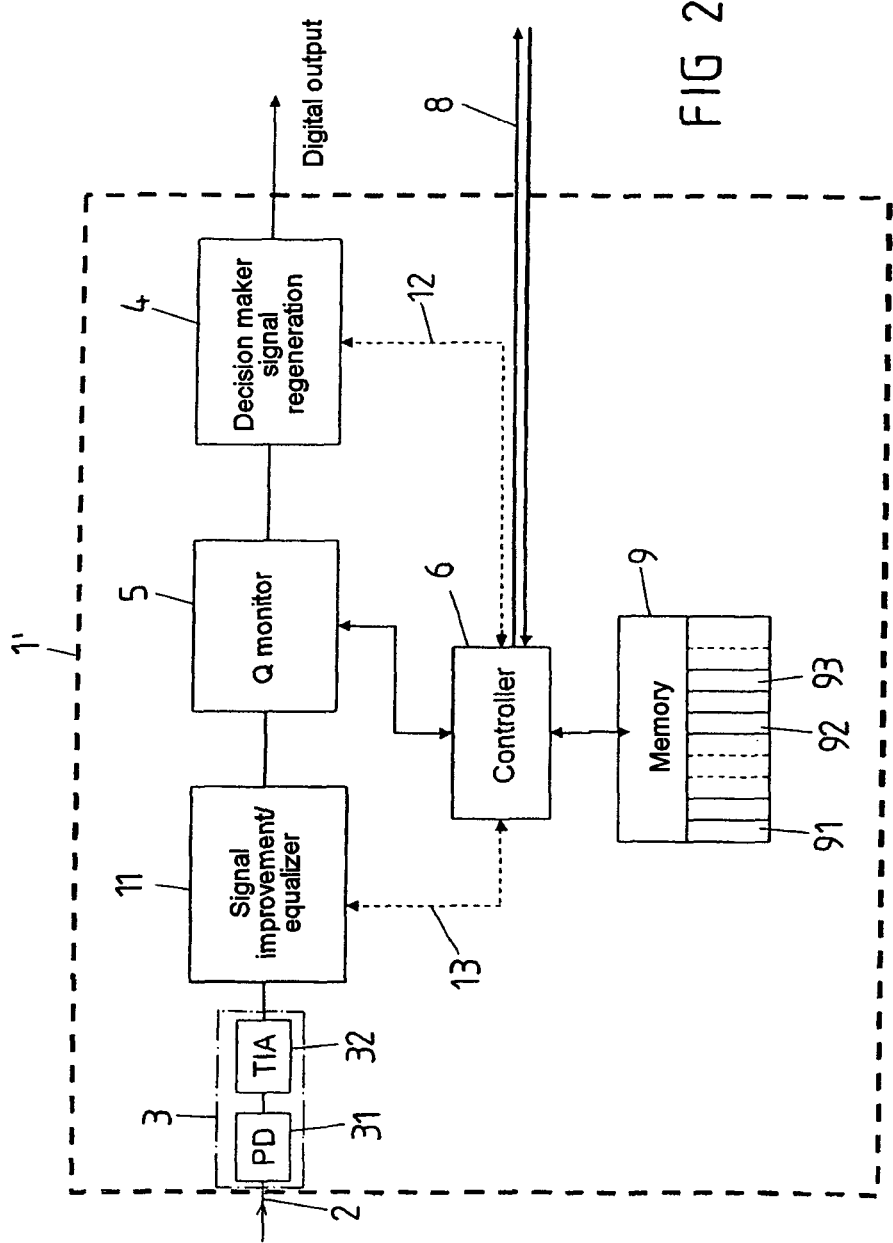
FIG. 2 shows a second exemplary embodiment of a digital optical receiving module, illustrating the individual functional blocks.

The exemplary embodiment in FIG. 2 shows an alternative refinement of a digital optical receiving module 1'. The receiving module 1' differs from the receiving module 1 shown in FIG. 1 in that the output of the transducer device 3 is first of all connected to a signal improvement device 11. The analog output signal which is produced at the output of the signal improvement device 11 is then supplied to the quality recording device 5 and to the decision-making device 4. The quality recording device 5 is connected to the controller 6.

The signal improvement device 11 corrects for interference and distortion in the analog signal caused, for example, by chromatic dispersion and mode dispersion. Appropriate integrated circuits are known per se. The signal conditioning is generally carried out by deliberate amplification of specific frequencies in order to emphasize the flank gradient (equalization). Furthermore, other signal conditioning measures may be carried out, such as signal filtering and level presetting.

In the exemplary embodiment shown in FIG. 2, the quality of the analog signal is assessed once it has been conditioned in the signal improvement device 11. In this case, the quality determined at that time can be signaled by means of the quality recording device 5 or the controller 6 to the signal improvement device 11 by a feedback path, as is illustrated schematically by the arrow 13. The determined quality or a signal derived from it can also be signaled to the decision-making device 4, see the arrow 12, so that these components can take account of information relating to the signal quality during the signal improvement and/or signal regeneration processes.

It should be mentioned that, despite the signal improvement in the block 11, the actual signal regeneration process is not carried out until the decision-making device 4.

Together with the signal improvement device 11, the quality recording device 5 may be part of a circuit for electronic dispersion compensation. The result of the quality monitoring is used not only for optimization of the input signal by means of the signal improvement device (feedback 13), but also for the comparison with the reference value which is stored in a memory area 91 of the memory 9. The quality assessment is carried out by comparison with a stored reference value as described with reference to FIG. 1, so that to this extent reference is made to the statements relating to this.

Figure 3:
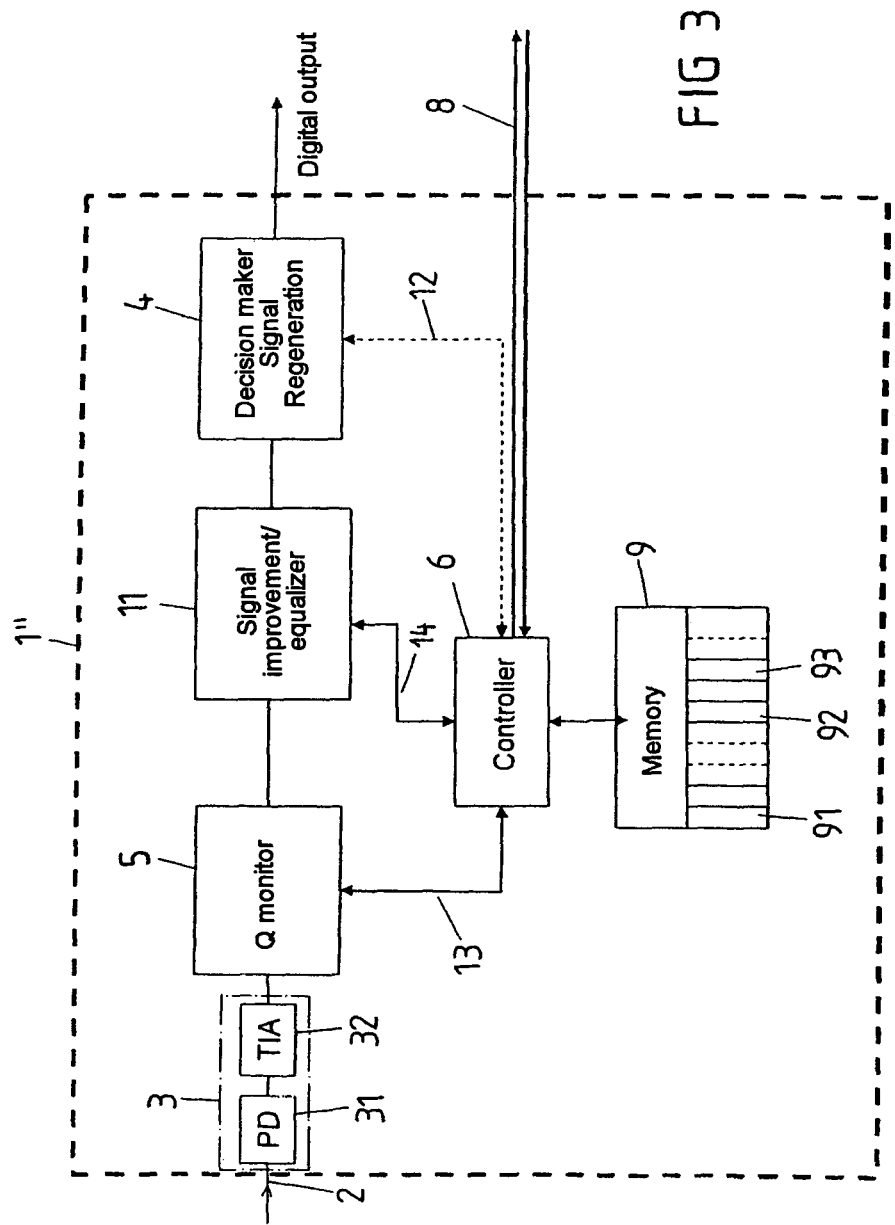
FIG. 3 shows a third exemplary embodiment of a digital optical receiving module, illustrating the individual functional blocks.

FIG. 3 shows a further exemplary embodiment of a digital optical receiving module 1". The difference in comparison to the exemplary embodiment shown in FIG. 2 is that the quality recording device 5 and the signal improvement device 11 are interchanged. In a corresponding manner, the quality recording device 5 directly checks the quality of the converted analog signal which has been amplified in the preamplifier 32. In this refinement, the signal improvement device 11 carries out signal improvement which is used solely to provide the decision-making device 4 with an improved basis for deciding whether an applied signal is digitized as a high value or as a low value. The signal improvement device 11 thus improves the probability of the decision-making device 4 making the "right" decision when producing a digital signal.

The controller 6 can signal the result of the quality monitoring process to the signal improvement device 11 via a link 14 between the signal improvement device 11 and the controller 6, so that the signal improvement device 11 can take account of the appropriate information during the signal improvement process.

It is also possible to provide for the signal improvement device 11 to be switched off when the analog electrical signal quality is good. If the quality recording device 5 determines that the signal quality is good, then the signal improvement device 11 in this refinement receives a control signal from the controller, via the link 14, to switch itself off. This reduces the current drawn by the module. If the signal deteriorates, the signal improvement device 11 is activated again.

Furthermore, control signals relating to the status of the signal improvement device 11 can be sent to the controller 6 via the link 14. In addition, it is also possible to provide for information relating to the operating state of the signal improvement device 11 to be written by the controller 6 to a memory area which is provided for this purpose in the memory 9, and to be read from this memory area via the output 8.

Apart from this, the refinement in FIG. 3 corresponds to the refinement in FIG. 2, so that reference should be made to the statements relating to this.

The embodiment of the invention is not restricted to the exemplary embodiments described above, which should be regarded only as examples. A person skilled in the art will see that numerous alternative embodiment variants exist which, despite their difference from the described exemplary embodiments, make use of the teaching as defined in the following claims.

We claim:

1. A digital optical receiving module to monitor a signal quality of a transmitted and modulated optical signal, the digital optical receiving module comprising:

an optical input;
a first digital electrical output;
an optoelectronic transducer device configured to convert a modulated optical signal to an analog electrical signal;
a decision-making device electrically connected to the transducer device, the decision-making device configured to convert the analog electrical signal to a digital signal and to pass the digital signal to the first digital electrical output;
a quality recording device electrically connected to the transducer device, the quality recording device configured to determine a quality of the analog electrical signal before it is converted to the digital signal by the decision-making device and to produce an information signal as a function of the quality of the analog electrical signal; and
a signal improvement device electrically connected between the transducer device and the decision-making device, the signal improvement device configured to improve the quality of the analog electrical signal when the quality of the analog electrical signal indicated by the information signal is below a threshold and to be turned off when the quality of the analog electrical signal indicated by the information signal is above the threshold.

2. The module as claimed in claim 1, wherein the module further comprises a second digital electrical output configured to transmit one of the information signal or a signal derived from the information signal for external communication.

3. The module as claimed in claim 2, wherein the second digital electrical output comprises a serial bus.

4. The module as claimed in claim 1, wherein the module further comprises a memory with a specific memory area configured to store at least one reference value, wherein the quality recording device is further configured to compare the determined quality of the analog electrical signal with the at least one reference value and to produce the information signal as a function of the result of the comparison.

5. The module as claimed in claim 1, wherein the quality recording device is configured to determine the quality of the analog electrical signal by evaluating at least a portion of an eye diagram generated in response to the analog electrical signal.

6. The module as claimed in claim 5, wherein the quality recording device is configured to determine the quality of the analog electrical signal by determining a value based on a free internal area of the eye diagram.

7. The module as claimed in claim 1, wherein the quality recording device is configured to determine the quality of the analog electrical signal from a measurement of a variance of phase angles of the analog electrical signal.

8. The module as claimed in claim 1, wherein the quality recording device is configured to determine the quality of the analog electrical signal from a noise component in the analog electrical signal.

9. The module as claimed in claim 1, wherein the module further comprises a controller configured to control at least the quality recording device and external communication.

10. The module as claimed in claim 1, wherein the transducer device comprises a photodiode configured to receive the modulated optical signal and an analog amplifier configured to amplify an electrical signal which is generated by the photodiode in response to the modulated optical signal.

11. A method of monitoring the signal quality of a transmitted, modulated optical signal, the method comprising:

converting a modulated optical signal which has passed through a transmission path to an analog electrical signal;

recording the quality of the analog electrical signal before its regeneration to a digital signal form;

producing an information signal as a function of the recorded quality of the analog electrical signal before the analog electrical signal is converted to the digital signal form;

improving the quality of the analog electrical signal, using a signal improvement device, before the analog electrical signal is converted to the digital signal form when the recorded quality indicated by the information signal is below a threshold, the signal improvement device being turned off when the recorded quality indicated by the information signal is above the threshold; and regenerating the analog electrical signal as a digital signal.

12. The method as claimed in claim 11, further comprising comparing the quality of the electrical signal with a reference value and producing the information signal as a function of a result of the comparison.

13. The method as claimed in claim 12, wherein producing the information signal comprises setting a flag in a memory, wherein the flag can be read from the memory via a communication link.

14. The method as claimed in claim 11, wherein recording the quality of the electrical signal comprises generating at least one numerical value, and wherein producing the information signal comprises comparing this numerical value with a reference value, wherein the information signal is produced as a function of the result of the comparison.

15. The method as claimed in claim 11, further comprising signaling the information signal to a management system of an associated network to identify errors in the analog electrical signal before regeneration of the analog electrical signal as the digital signal.

16. The method as claimed in claim 15, further comprising:
at the management system, using a transmission path other than the transmission path through which the modulated optical signal has passed in response to receiving the information signal that identifies errors.

17. A digital optical receiving module to monitor a signal quality of a transmitted and modulated optical signal, the digital optical receiving module comprising:
an optical input;
a digital electrical output;
an optoelectronic transducer device configured to convert a modulated optical signal, applied to the optical input, to an analog electrical signal;
a decision-making device electrically connected to the transducer device, the decision-making device is configured to convert the analog electrical signal to a digital signal and to pass the digital signal to the digital electrical output;
a quality recording device electrically connected to the transducer device, wherein:
the quality recording device is configured to determine and record a quality of the analog electrical signal before it is converted to the digital signal by the decision-making device;
the quality is determined by comparing the recorded quality of the analog electrical signal with a reference value;
the quality recording device is configured to produce a bi-level information signal at one of a high logic level and a low logic level as a function of the quality of the analog electrical signal; and
the information signal is signaled to a management system of an associated network to identify deterioration of a transmission path before converting the analog electrical signal to the digital signal; and
a signal improvement device electrically connected between the transducer device and the decision-making device and configured to improve the quality of the analog electrical signal before its conversion to the digital signal by the decision-making device, wherein the module is configured to turn the signal improvement device off when the signal quality indicated by the information signal is above a threshold.

* * * * *